J. Rich,
Lathe Chuck.
No. 96,730. Patented Nov. 9, 1869.
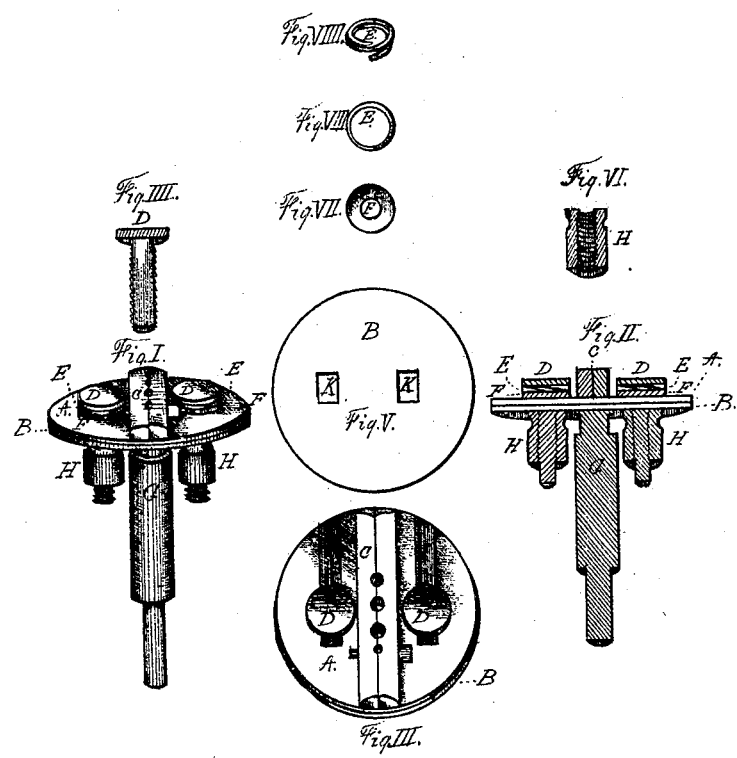
Witnesses.

United States Patent Office.

JOHN RICH, OF PAINESVILLE, OHIO.

Letters Patent No. 96,730, dated November 9, 1869.

IMPROVED LATHE-CHUCK.

The Schedule referred to in these Letters Patent and making part of the same.

*To all whom it may concern:*

Be it known that I, JOHN RICH, of Painesville, in the county of Lake, and State of Ohio, have invented certain Improvements in Chucks; and I do hereby declare that the following is a full and exact description thereof, which will enable those skilled in the art to make and use the same, reference being had to the accompanying drawings, and letters of reference marked thereon, in which—

Figure I is a perspective view of the chuck, with all its parts complete. A, a slide-plate, with jaws C attached. B, plate, attached to stem G. D D, bolts, passing through plates A and B, and secured by nuts H H. E E, spiral springs, confined between the head of bolts D and bevelled washers F F.

Figure II, longitudinal section, showing section of all parts. A, slide-plate; B, plate, attached to stem G; C, jaws; D D, bolts; E E, spiral springs; F F, bevelled washers; G, stem; H H, nuts, to secure bolts D D.

Figure III. A, slide-plate; B, plate, attached to stem G; C, jaws; D D, bolts; I I, slots in slide-plate A.

Figure IV, bolt D.

Figure V, plate B, showing slots K K.

Figure VI, nut H, to secure bolts D.

Figure VII, bevelled washer F.

Figures VIII and IX, views of spiral springs E.

The letters of reference indicate similar parts in all the figures.

The improvements herein referred to consist in the employment of a chuck, composed of two plates, the plate B being attached rigidly to the stem G, which stem is secured to the lathe by a screw at its end, or by driving it into the end of the lathe-spindle.

The plate A slides freely on the surface of the plate B, allowing it to adjust itself to a centre, as will be described.

The plate A is secured to the plate B by the bolts D D, which are held to their work by the spiral springs E E, and bevelled washers F F The nuts H H secure the top plate to its place, after the centre is found.

The following is a description of the construction and operation of my said improvements.

This chuck is composed of two plates, the plate B being rigidly secured to the lathe-spindle, and revolving with it. The plate A is secured to the plate B by bolts D D, and slotted, as shown by the slots I I, in Fig. III, to allow it to slide back and forth, while revolving.

The operation is thus:

The article to be turned is secured between the jaws C, and in one of the holes, which will fit  The slide-plate A is then pushed forward, the slots I I guiding it to its place.

Then the shaft is revolved, and the rest is placed in position, and a piece of wood is pressed against the article to be turned, pressing it to the centre, the springs E E and bevel washers F F holding it secure till the nuts H H are turned up tight.

The plate A can be removed, and another substituted, with larger or smaller holes in the jaws C.

Jewellers and watch-repairers will appreciate this chuck, after using those now in use, none of which will turn a pivot perfectly true, and oftentimes eccentric with the shaft.

The sliding of the plate A on the plate B allows it to form its own centre, which will be seen as a new feature in chucks for jewellers' use.

This chuck is designed to do away entirely with the waxing-process for securing watch-pivots and other work to the lathe.

What I claim as my invention, and desire to secure by Letters Patent, is—

1. The construction of a chuck, composed of two plates, A and B, the plate A sliding on the plate B, and secured by the bolts D D, springs E E, and bevel washers F F. Said chuck, while revolving, finds its own centre, and operates as above described.

2. The combination and arrangement of the plates A and B, attached to stem G, jaws C, bolts D D, springs E E, bevelled washers F F, and nuts H H, the whole combined and arranged for the purpose as described.

JOHN RICH.

Witnesses:
 WM. PETTINGELL,
 WILLIAM CURPHEY.